Dec. 24, 1929.     H. SCHULER ET AL     1,740,907
CARRIAGE FOR LIGHT ORDNANCE
Filed Oct. 2, 1928     2 Sheets-Sheet 2
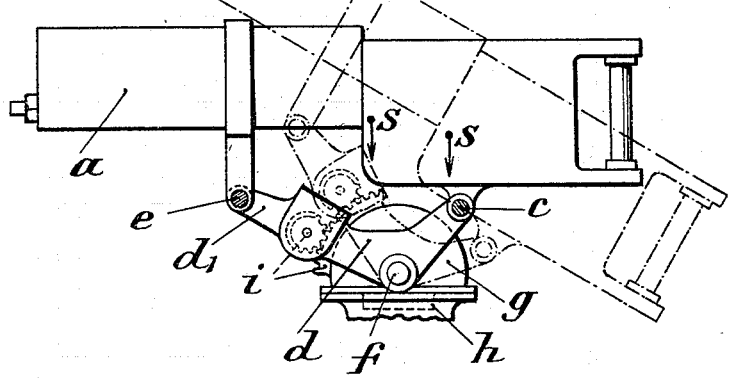
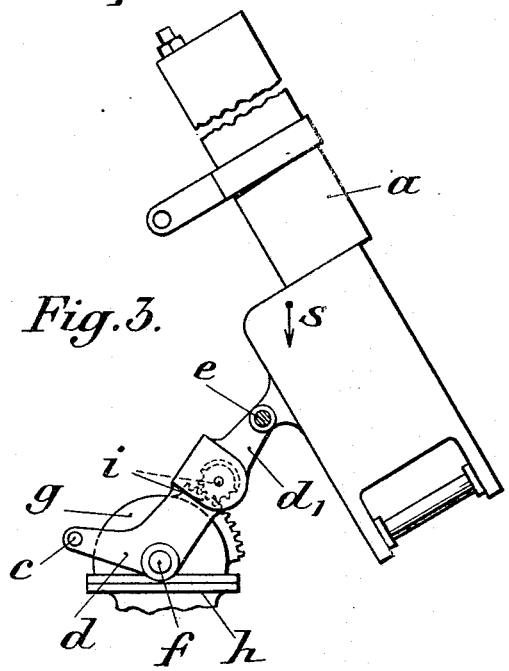

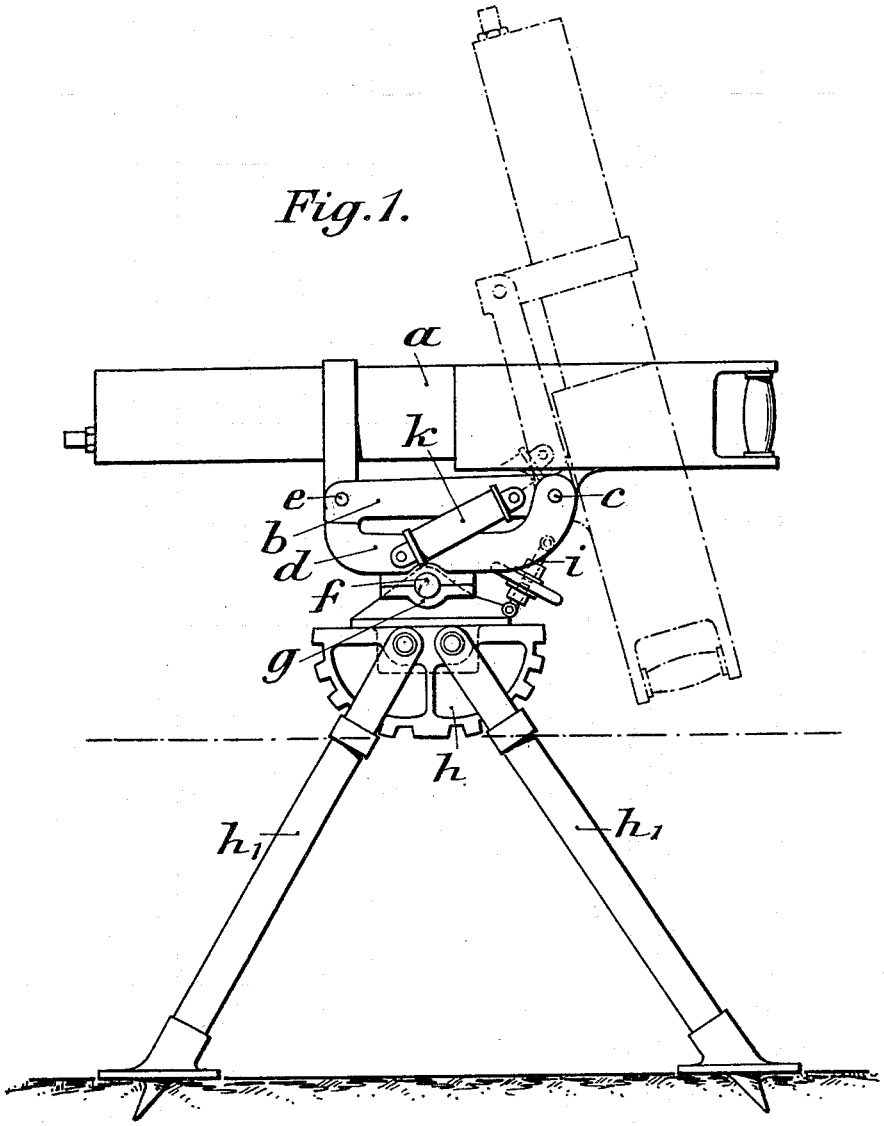

Patented Dec. 24, 1929

1,740,907

UNITED STATES PATENT OFFICE

HERMANN SCHULER AND FRIEDRICH LINDER, OF DUSSELDORF, GERMANY, ASSIGNORS TO RHEINISCHE METALLWAAREN- UND MASCHINENFABRIK, OF DUSSELDORF-DERENDORF, GERMANY

CARRIAGE FOR LIGHT ORDNANCE

Application filed October 2, 1928, Serial No. 309,854, and in Germany April 30, 1926.

The invention relates to a carriage for light ordnance, in particular machine guns and has for its object to afford a carriage which allows both to impart to the gun by means of an elevating gear an exact adjustment to fire at aims at small angles of elevation and a high angle position suitable to fire at aerial aims, and to further enable the gun when in this latter position to be easily and unhinderedly elevated and trained. In order to attain in this latter case the high pointing velocities required to follow quickly moving aims, such as airplanes, the masses to be swung are restricted to the lowest possible amount.

According to the invention an upper carriage is interposed between the gun and the lower carriage, which latter may consist e. g. in a tripod, and the upper carriage may be elevated by means of an elevating gear about horizontal trunnions relatively to the lower carriage and is connected to the gun in such a manner that when the gun is to be pointed by means of the elevating gear to fire at small angles of elevation, this connection is rigid, while it can be converted into an articulated one, when aerial aims are to be fired at. In this latter case, therefore, merely the gun itself is swung about horizontal trunnions relatively to the upper carriage. In this manner any participation of other parts of the carriage, e. g. of the upper carriage is avoided, which participation would disturb these gun motions as with known carriages.

In order to allow of the invention to be more easily understood, two preferred embodiments of the same are illustrated by way of example in the drawings which accompany and form part of this specification.

In these drawings

Figure 1 is an elevation of a machine gun mounted on a carriage designed according to the first embodiment, Figure 2 is a fragmentary lateral view of a machine gun mounted on a carriage designed according to the other embodiment, with the gun in a position suitable to fire at ground aims at small angle of elevation, and Figure 3 is a view similar to Figure 2 with the gun in a position suitable to fire at aerial aims at a high angle of elevation.

Referring first to Figure 1, $a$ denotes the gun which rests on a carrier $b$ swingingly mounted on the rear end of the upper carriage $d$ by means of horizontal trunnions $c$. By means of a detachable bolt $e$ a rigid connection is established between the carrier $b$ and the upper carriage $d$. The latter may swing relatively to the head $q$ of the lower carriage about trunnions $f$. The head $g$ is capable to be trained relatively to the tripod $h$.

Between the head $g$ of the lower carriage and the upper carriage $d$ there is inserted an elevating gear $i$ that may be designed e. g. as a screw gear and serves to point the upper carriage together with the gun on the head $g$ within a small angular range. The center of gravity of the masses swinging about the axis of the trunnions $f$, that is the gun $a$, the carrier $b$, and the upper carriage $d$, is located within the amplitude of the elevating gear $i$ approximately above the trunnions $f$.

When aerial aims are to be fired at great angles of elevation, the bolt $e$ connecting the gun carrier $b$ to the upper carriage $d$ is withdrawn and the gun is swung by hand about the horizontal trunnions $c$. A spring equalizer $k$, that is provided between the carrier $b$ and the upper carriage $d$ serves in this case to compensate for the masses of the gun situated behind the horizontal trunnions $c$. The fulcrum, that is the elevating axis formed by the trunnions $c$ is so disposed that an elevation up to approximately 90 degrees can be imparted to the gun, as shown in dot and dash lines in Figure 1, without the gun striking any part of the lower carriage $h$ or, with the lowermost firing height and the legs $h^1$ of the tripod completely straddled, striking the ground, while at the same time the head unhinderedly can be trained round about, to train the gun.

A fixing device (not shown) provided between the gun carrier $b$ and the upper carriage $d$ and arranged e. g. at the trunnions $c$ enables a fine adjustment of the gun, when in the high angle position, that is upon the front end of carrier $b$ being detached from the upper carriage $d$. This fine adjustment is performed by swinging the upper carriage $d$ about the horizontal trunnions $f$ by means of the elevating gear $i$. In order to be able to point the gun $a$ directly by hand when it is being coupled by bolt $e$ with the upper carriage $d$ and low aims are to be fired at with small angles of elevation, the elevating gear $i$ may be designed so as to be disconnected.

In the embodiment illustrated in Figures 2 and 3 a compensation of the gun masses to be swung by hand about the trunnions $c$ on the upper carriage upon firing at aerial aims is established merely in a manner in which the gun $a$ is supported by the upper carriage $d$, so that an equalizer may be dispensed with. The gun $a$ is directly connected to the upper carriage $d$ without a special carrier $b$ being provided, and the rear fulcrum $c$ is located as close to the horizontal trunnions $f$ of the upper carriage $d$, as admitted by the construction of the head $g$. The fulcurm $c$ is arranged on the gun $a$ itself and more particularly in such a location, that the center of gravity denoted by S of the gun swings to and fro approximately vertically above the fulcrum $c$, when the gun is pointed in elevation by swinging it about fulcrum $c$, to fire at aerial aims, within the range of about 30 to 70 degrees, as substantially coming into consideration in this case. The front portion $d^1$ of the upper carriage $d$ carries the connecting bolt $e$ and notably projects beyond the neighboring parts of the head $g$ and of the lower carriage.

When the gun is to be pointed at ground aims at small angles of elevation, the pointing operation is performed by means of the elevating gear $i$ as with the first-described embodiment. When aerial aims are to be fired at, the gun could be swung by hand about the axis $c$ after the bolt $e$ has been withdrawn. In order to increase, however, the amplitude of elevation, the upper carriage $d$ is adjusted first to the highest elevation to be imparted to it by the elevating gear $i$, that is to about 30 degrees, thereupon the gun $a$ is removed from the upper carriage $d$ by disconnecting both bolt $e$ and trunnions $c$, the upper carriage is turned 180 degrees so that arm $d^1$ extends in rearward direction, whereupon the gun $a$ is hinged with its rear supporting eye to the eye of arm $d^1$ which latter eye formerly lodged the front bolt $e$. By this manipulation the firing height of the gun is considerably increased, the rear portion of the gun is removed out of the region of the lower carriage $h$, so that the gun now can be swung round about without any hindrance and the attendance and the sighting and pointing operations are considerably facilitated.

We claim as our invention:—

1. In light ordnance a lower carriage, an upper carriage adapted to be trained and elevated thereon, a gun mounted on and adapted to be elevated relatively to, said upper carriage, and disconnectible means for rigidly fixing said gun on said upper carriage.

2. In light ordnance a lower carriage, an upper carriage adapted to be trained and elevated thereon, a gun, a detachable horizontal hinged connection between the rear portion of said upper carriage and that of said gun, the fulcrum of said hinged connection being located close to the elevating axis of said upper carriage, another detachable horizontal hinged connection between the front portion of said upper carriage and that of said gun, the fulcrum of said latter connection being arranged far away from the elevating axis of said upper carriage, the operative parts of said connections being of equal dimensions.

3. In light ordnance a lower carriage, an upper carriage adapted to be trained and elevated thereon, a gun mounted on and adapted to be elevated relatively to, said upper carriage, and disconnectible means for rigidly fixing said gun on said upper carriage, the location of the elevating axis of said upper carriage and of that of said gun relatively to the center of gravity of the latter being determined so as to cause the masses swung in elevating, respectively, the upper carriage with the gun and the gun alone to be compensated for as far as possible relatively to, respectively, said first-named axis and said last-named one.

4. In light ordnance a lower carriage, an upper carriage adapted to be trained and elevated thereon, a gun, a detachable horizontal hinged connection between the rear portion of said upper carriage and that of said gun, and another detachable horizontal hinged connection between the front portion of said upper carriage and that of said gun, the operative parts of said connections being of equal dimensions, the location of the elevating axis of said upper carriage and of that of said rearward hinged connection relatively to the center of gravity of said gun being determined so as to cause the masses swung in elevating, respectively, the upper carriage with the gun and the gun alone to be compensated for as far as possible relatively to, respectively, said first-named axis and said last-named one.

In testimony whereof we have affixed our signatures.

HERMANN SCHULER.
FRIEDRICH LINDER.